US008245242B2

(12) United States Patent
Peterson et al.

(10) Patent No.: US 8,245,242 B2
(45) Date of Patent: Aug. 14, 2012

(54) SYSTEMS AND METHODS FOR MANAGING POLICIES ON A COMPUTER

(75) Inventors: Matthew T. Peterson, Lindon, UT (US); Daniel F. Peterson, Provo, UT (US)

(73) Assignee: Quest Software, Inc., Aliso Viejo, CA (US)

( * ) Notice: Subject to any disclaimer, the term of this patent is extended or adjusted under 35 U.S.C. 154(b) by 377 days.

(21) Appl. No.: 12/612,569

(22) Filed: Nov. 4, 2009

(65) Prior Publication Data

US 2010/0050232 A1     Feb. 25, 2010

Related U.S. Application Data

(63) Continuation of application No. 10/888,845, filed on Jul. 9, 2004, now Pat. No. 7,617,501.

(51) Int. Cl.
*G06F 13/00* (2006.01)
(52) U.S. Cl. ......... 719/319; 709/201; 709/220; 709/223
(58) Field of Classification Search .................. 719/319; 709/201, 220, 223
See application file for complete search history.

(56) References Cited

U.S. PATENT DOCUMENTS

| | | |
|---|---|---|
| 4,370,707 A | 1/1983 | Phillips et al. |
| 4,694,397 A | 9/1987 | Grant |
| 5,222,018 A | 6/1993 | Sharpe et al. |
| 5,267,865 A | 12/1993 | Lee et al. |
| 5,302,132 A | 4/1994 | Corder |
| 5,310,349 A | 5/1994 | Daniels et al. |
| 5,313,465 A | 5/1994 | Perlman et al. |
| 5,333,302 A | 7/1994 | Hensley et al. |
| 5,339,435 A | 8/1994 | Lubkin et al. |
| 5,367,698 A | 11/1994 | Webber et al. |
| 5,371,852 A | 12/1994 | Attanasio et al. |
| 5,387,104 A | 2/1995 | Corder |
| 5,410,703 A | 4/1995 | Nilsson et al. |
| 5,423,032 A | 6/1995 | Byrd et al. |
| 5,437,027 A | 7/1995 | Bannon et al. |
| 5,437,555 A | 8/1995 | Ziv-el |

(Continued)

FOREIGN PATENT DOCUMENTS

EP    1 932 279 A2    6/2008

(Continued)

OTHER PUBLICATIONS

Oct. 26, 2011, U.S. Appl. No. 95/001,458—Office Action—Transmittal of Communications to Third Party Requester Inter Partes Reexamination, 52 pages.

(Continued)

*Primary Examiner* — Andy Ho
(74) *Attorney, Agent, or Firm* — Knobbe Martens Olson & Bear LLP

(57) ABSTRACT

An apparatus, system, and method are disclosed for managing policies on a computer having a foreign operating system. Policies may specify hardware or software configuration information. Policies on a first computer with a native operating system are translated into configuration information usable on a second computer having a foreign operating system. In an embodiment, a translator manager manages the association between the policy on the first computer and the translator on the second computer. Computer management complexity and information technology management costs are reduced by centralizing computer management on the native operating system. Further reductions in management complexity are realized when the present invention is used in conjunction with network directory services.

19 Claims, 7 Drawing Sheets

U.S. PATENT DOCUMENTS

| | | |
|---|---|---|
| 5,440,719 A | 8/1995 | Hanes et al. |
| 5,441,415 A | 8/1995 | Lee et al. |
| 5,497,486 A | 3/1996 | Stolfo et al. |
| 5,497,492 A | 3/1996 | Zbikowski et al. |
| 5,499,379 A | 3/1996 | Tanaka et al. |
| 5,530,829 A | 6/1996 | Beardsley et al. |
| 5,550,968 A | 8/1996 | Miller et al. |
| 5,550,976 A | 8/1996 | Henderson et al. |
| 5,553,291 A | 9/1996 | Tanaka et al. |
| 5,586,304 A | 12/1996 | Stupek, Jr. et al. |
| 5,590,360 A | 12/1996 | Edwards |
| 5,600,833 A | 2/1997 | Senn et al. |
| 5,608,874 A | 3/1997 | Ogawa et al. |
| 5,608,903 A | 3/1997 | Prasad et al. |
| 5,613,090 A | 3/1997 | Willems |
| 5,623,601 A | 4/1997 | Vu |
| 5,630,069 A | 5/1997 | Flores et al. |
| 5,630,131 A | 5/1997 | Palevich et al. |
| 5,659,735 A | 8/1997 | Parrish et al. |
| 5,659,736 A | 8/1997 | Hasegawa et al. |
| 5,666,502 A | 9/1997 | Capps et al. |
| 5,671,428 A | 9/1997 | Muranaga et al. |
| 5,673,386 A | 9/1997 | Batra |
| 5,673,387 A | 9/1997 | Chen et al. |
| 5,675,782 A | 10/1997 | Montague et al. |
| 5,677,997 A | 10/1997 | Talatik |
| 5,680,586 A | 10/1997 | Elkins et al. |
| 5,684,950 A | 11/1997 | Dare et al. |
| 5,692,132 A | 11/1997 | Hogan |
| 5,692,902 A | 12/1997 | Aeby |
| 5,694,540 A | 12/1997 | Humelsine et al. |
| 5,706,502 A | 1/1998 | Foley et al. |
| 5,708,812 A | 1/1998 | Van Dyke et al. |
| 5,708,828 A | 1/1998 | Coleman |
| 5,710,884 A | 1/1998 | Dedrick |
| 5,711,671 A | 1/1998 | Geeslin et al. |
| 5,724,521 A | 3/1998 | Dedrick |
| 5,727,145 A | 3/1998 | Nessett et al. |
| 5,727,951 A | 3/1998 | Ho et al. |
| 5,740,427 A | 4/1998 | Stoller et al. |
| 5,743,746 A | 4/1998 | Ho et al. |
| 5,745,113 A | 4/1998 | Jordan et al. |
| 5,745,902 A | 4/1998 | Miller et al. |
| 5,752,042 A | 5/1998 | Cole et al. |
| 5,754,173 A | 5/1998 | Hiura et al. |
| 5,754,938 A | 5/1998 | Herz et al. |
| 5,758,062 A | 5/1998 | McMahon et al. |
| 5,758,074 A | 5/1998 | Marlin et al. |
| 5,758,344 A | 5/1998 | Prasad et al. |
| 5,764,897 A | 6/1998 | Khalidi |
| 5,765,140 A | 6/1998 | Knudson et al. |
| 5,768,519 A | 6/1998 | Swift et al. |
| 5,774,551 A | 6/1998 | Wu et al. |
| 5,778,169 A | 7/1998 | Reinhardt |
| 5,784,553 A | 7/1998 | Kolawa et al. |
| 5,784,643 A | 7/1998 | Shields |
| 5,790,801 A | 8/1998 | Funato |
| 5,796,393 A | 8/1998 | MacNaughton et al. |
| 5,806,075 A | 9/1998 | Jain et al. |
| 5,812,669 A | 9/1998 | Jenkins et al. |
| 5,812,865 A | 9/1998 | Theimer et al. |
| 5,815,657 A | 9/1998 | Williams et al. |
| 5,819,265 A | 10/1998 | Ravin et al. |
| 5,819,281 A | 10/1998 | Cummins |
| 5,819,295 A | 10/1998 | Nakagawa et al. |
| 5,822,518 A | 10/1998 | Ooki et al. |
| 5,835,087 A | 11/1998 | Herz et al. |
| 5,835,911 A | 11/1998 | Nakagawa et al. |
| 5,838,918 A | 11/1998 | Prager et al. |
| 5,844,508 A | 12/1998 | Murashita et al. |
| 5,848,396 A | 12/1998 | Gerace |
| 5,859,972 A | 1/1999 | Subramaniam et al. |
| 5,872,928 A | 2/1999 | Lewis et al. |
| 5,872,973 A | 2/1999 | Mitchell et al. |
| 5,878,432 A | 3/1999 | Misheski et al. |
| 5,889,520 A | 3/1999 | Glaser |
| 5,890,161 A | 3/1999 | Helland et al. |
| 5,890,175 A | 3/1999 | Wong et al. |
| 5,892,898 A | 4/1999 | Fujii et al. |
| 5,893,074 A | 4/1999 | Hughes et al. |
| 5,893,076 A | 4/1999 | Hafner et al. |
| 5,893,916 A | 4/1999 | Dooley |
| 5,930,512 A | 7/1999 | Boden et al. |
| 5,937,165 A | 8/1999 | Schwaller et al. |
| 5,948,064 A | 9/1999 | Bertram et al. |
| 5,949,419 A | 9/1999 | Domine et al. |
| 5,956,732 A | 9/1999 | Tsuchida |
| 5,956,736 A | 9/1999 | Hanson et al. |
| 5,960,200 A | 9/1999 | Eager et al. |
| 5,987,247 A | 11/1999 | Lau |
| 5,995,114 A | 11/1999 | Wegman et al. |
| 6,002,868 A | 12/1999 | Jenkins et al. |
| 6,003,047 A | 12/1999 | Osmond et al. |
| 6,014,669 A | 1/2000 | Slaughter et al. |
| 6,014,712 A | 1/2000 | Islam et al. |
| 6,016,495 A | 1/2000 | McKeehan et al. |
| 6,016,501 A | 1/2000 | Martin et al. |
| 6,021,496 A | 2/2000 | Dutcher et al. |
| 6,029,178 A | 2/2000 | Martin et al. |
| 6,029,195 A | 2/2000 | Herz |
| 6,029,247 A | 2/2000 | Ferguson |
| 6,035,323 A | 3/2000 | Narayen et al. |
| 6,041,344 A | 3/2000 | Bodamer et al. |
| 6,044,368 A | 3/2000 | Powers |
| 6,044,465 A | 3/2000 | Dutcher et al. |
| 6,049,822 A | 4/2000 | Mittal |
| 6,052,512 A | 4/2000 | Peterson et al. |
| 6,055,538 A | 4/2000 | Kessenich et al. |
| 6,058,260 A | 5/2000 | Brockel et al. |
| 6,058,379 A | 5/2000 | Odom et al. |
| 6,061,643 A | 5/2000 | Walker et al. |
| 6,061,650 A | 5/2000 | Malking et al. |
| 6,067,568 A | 5/2000 | Li et al. |
| 6,070,184 A | 5/2000 | Blount et al. |
| 6,076,166 A | 6/2000 | Moshfeghi et al. |
| 6,079,020 A | 6/2000 | Liu |
| 6,092,199 A | 7/2000 | Dutcher et al. |
| 6,101,481 A | 8/2000 | Miller |
| 6,101,503 A | 8/2000 | Cooper et al. |
| 6,108,649 A | 8/2000 | Young et al. |
| 6,108,670 A | 8/2000 | Weida et al. |
| 6,112,228 A | 8/2000 | Earl et al. |
| 6,112,240 A | 8/2000 | Pogue et al. |
| 6,115,040 A | 9/2000 | Bladow et al. |
| 6,115,544 A | 9/2000 | Mueller |
| 6,134,548 A | 10/2000 | Gottsman et al. |
| 6,137,869 A | 10/2000 | Voit et al. |
| 6,138,086 A | 10/2000 | Rose et al. |
| 6,141,006 A | 10/2000 | Knowlton et al. |
| 6,141,010 A | 10/2000 | Hoyle |
| 6,141,647 A | 10/2000 | Meijer et al. |
| 6,151,600 A | 11/2000 | Dedrick |
| 6,151,610 A | 11/2000 | Senn et al. |
| 6,161,176 A | 12/2000 | Hunter et al. |
| 6,167,445 A | 12/2000 | Gai et al. |
| 6,167,564 A | 12/2000 | Fontana et al. |
| 6,170,009 B1 | 1/2001 | Mandal et al. |
| 6,182,212 B1 | 1/2001 | Atkins et al. |
| 6,182,226 B1 | 1/2001 | Reid et al. |
| 6,185,625 B1 | 2/2001 | Tso et al. |
| 6,195,794 B1 | 2/2001 | Buxton |
| 6,199,068 B1 | 3/2001 | Carpenter |
| 6,199,079 B1 | 3/2001 | Gupta et al. |
| 6,202,051 B1 | 3/2001 | Woolston |
| 6,205,480 B1 | 3/2001 | Broadhurst et al. |
| 6,208,345 B1 | 3/2001 | Sheard et al. |
| 6,209,000 B1 | 3/2001 | Klein et al. |
| 6,209,033 B1 | 3/2001 | Datta et al. |
| 6,222,535 B1 | 4/2001 | Hurd, II |
| 6,223,221 B1 | 4/2001 | Kunz |
| 6,226,649 B1 | 5/2001 | Bodamer et al. |
| 6,230,160 B1 | 5/2001 | Chan et al. |
| 6,230,249 B1 | 5/2001 | Chan et al. |
| 6,230,309 B1 | 5/2001 | Turner et al. |
| 6,233,584 B1 | 5/2001 | Purcell |
| 6,237,114 B1 | 5/2001 | Wookey et al. |
| 6,246,410 B1 | 6/2001 | Bergeron et al. |

| | | |
|---|---|---|
| 6,249,905 B1 | 6/2001 | Yoshida et al. |
| 6,256,637 B1 | 7/2001 | Venkatesh et al. |
| 6,256,659 B1 | 7/2001 | McLain, Jr. et al. |
| 6,256,678 B1 | 7/2001 | Traughber et al. |
| 6,260,068 B1 * | 7/2001 | Zalewski et al. ............... 709/226 |
| 6,263,352 B1 | 7/2001 | Cohen |
| 6,266,666 B1 | 7/2001 | Ireland et al. |
| 6,269,405 B1 | 7/2001 | Dutcher et al. |
| 6,269,406 B1 | 7/2001 | Dutcher et al. |
| 6,272,673 B1 | 8/2001 | Dale et al. |
| 6,272,678 B1 | 8/2001 | Imachi et al. |
| 6,279,030 B1 | 8/2001 | Britton et al. |
| 6,282,576 B1 | 8/2001 | Lane |
| 6,282,605 B1 | 8/2001 | Moore |
| 6,286,028 B1 | 9/2001 | Cohen et al. |
| 6,286,104 B1 | 9/2001 | Buhle et al. |
| 6,301,601 B1 | 10/2001 | Helland et al. |
| 6,304,893 B1 | 10/2001 | Gish |
| 6,308,164 B1 | 10/2001 | Nummelin et al. |
| 6,308,188 B1 | 10/2001 | Bernardo et al. |
| 6,308,273 B1 | 10/2001 | Goertzel et al. |
| 6,313,835 B1 | 11/2001 | Gever et al. |
| 6,314,434 B1 | 11/2001 | Shigemi et al. |
| 6,327,677 B1 | 12/2001 | Garg et al. |
| 6,330,566 B1 | 12/2001 | Durham |
| 6,336,118 B1 | 1/2002 | Hammond |
| 6,341,287 B1 | 1/2002 | Siziklai et al. |
| 6,345,239 B1 | 2/2002 | Bowman-amuah |
| 6,349,287 B1 | 2/2002 | Hayashi |
| 6,363,398 B1 | 3/2002 | Andersen |
| 6,370,573 B1 | 4/2002 | Bowman-Amuah |
| 6,370,646 B1 | 4/2002 | Goodman et al. |
| 6,381,579 B1 | 4/2002 | Gervais et al. |
| 6,389,589 B1 | 5/2002 | Mishra et al. |
| 6,401,085 B1 | 6/2002 | Gershman et al. |
| 6,401,211 B1 | 6/2002 | Brezak, Jr. et al. |
| 6,405,364 B1 | 6/2002 | Bowman-amuah |
| 6,430,556 B1 | 8/2002 | Goldberg et al. |
| 6,438,514 B1 | 8/2002 | Hill et al. |
| 6,442,620 B1 | 8/2002 | Thatte et al. |
| 6,446,096 B1 | 9/2002 | Holland et al. |
| 6,453,317 B1 | 9/2002 | LaCost et al. |
| 6,457,130 B2 | 9/2002 | Hitz et al. |
| 6,466,932 B1 | 10/2002 | Dennis et al. |
| 6,469,713 B2 | 10/2002 | Hetherington et al. |
| 6,473,794 B1 | 10/2002 | Guheen et al. |
| 6,496,847 B1 | 12/2002 | Bugnion et al. |
| 6,587,876 B1 | 7/2003 | Mahon et al. |
| 6,615,258 B1 | 9/2003 | Barry et al. |
| 6,625,622 B1 | 9/2003 | Henrickson et al. |
| 6,658,625 B1 | 12/2003 | Allen |
| 6,678,714 B1 | 1/2004 | Olapurath et al. |
| 6,715,128 B1 | 3/2004 | Hirashima et al. |
| 6,728,877 B2 | 4/2004 | Mackin et al. |
| 6,735,691 B1 | 5/2004 | Capps et al. |
| 6,757,696 B2 | 6/2004 | Multer et al. |
| 6,760,761 B1 | 7/2004 | Sciacca |
| 6,795,835 B2 | 9/2004 | Ricart et al. |
| 6,801,946 B1 | 10/2004 | Child et al. |
| 6,817,017 B2 | 11/2004 | Goodman |
| 6,839,766 B1 | 1/2005 | Parnafes et al. |
| 6,880,005 B1 | 4/2005 | Bell et al. |
| 6,925,477 B1 | 8/2005 | Champagne et al. |
| 6,941,465 B1 * | 9/2005 | Palekar et al. ................... 726/1 |
| 6,944,183 B1 | 9/2005 | Iyer et al. |
| 6,950,818 B2 | 9/2005 | Dennis et al. |
| 6,950,935 B1 | 9/2005 | Allavarpu et al. |
| 6,968,370 B2 | 11/2005 | Wu |
| 6,973,488 B1 | 12/2005 | Yavatkar et al. |
| 6,976,090 B2 | 12/2005 | Ben-Shaul et al. |
| 7,028,079 B2 | 4/2006 | Mastrianni et al. |
| 7,062,781 B2 | 6/2006 | Shambroom |
| 7,080,077 B2 | 7/2006 | Ramamurthy et al. |
| 7,089,584 B1 | 8/2006 | Sharma |
| 7,100,195 B1 | 8/2006 | Underwood |
| 7,117,486 B2 | 10/2006 | Wong et al. |
| 7,133,984 B1 | 11/2006 | Dickensheets |
| 7,139,973 B1 | 11/2006 | Kirkwood et al. |
| 7,143,095 B2 | 11/2006 | Barrett et al. |
| 7,162,640 B2 | 1/2007 | Heath et al. |
| 7,171,458 B2 | 1/2007 | Brown et al. |
| 7,185,073 B1 * | 2/2007 | Gai et al. ....................... 709/221 |
| 7,209,970 B1 | 4/2007 | Everson et al. |
| 7,213,266 B1 | 5/2007 | Maher et a |
| 7,216,181 B1 | 5/2007 | Jannu et al. |
| 7,231,460 B2 | 6/2007 | Sullivan et al. |
| 7,243,370 B2 | 7/2007 | Bobde et al. |
| 7,284,043 B2 | 10/2007 | Feinleib et al. |
| 7,299,504 B1 | 11/2007 | Tiller et al. |
| 7,346,766 B2 | 3/2008 | Mackin et al. |
| 7,356,601 B1 | 4/2008 | Clymer et al. |
| 7,356,816 B2 | 4/2008 | Goodman et al. |
| 7,379,996 B2 | 5/2008 | Papatla et al. |
| 7,418,597 B2 | 8/2008 | Thornton et al. |
| 7,421,555 B2 | 9/2008 | Dorey |
| 7,426,642 B2 | 9/2008 | Aupperle et al. |
| 7,428,583 B1 | 9/2008 | Lortz et al. |
| 7,440,962 B1 | 10/2008 | Wong et al. |
| 7,444,401 B1 | 10/2008 | Keyghobad et al. |
| 7,467,141 B1 | 12/2008 | Steele et al. |
| 7,478,418 B2 | 1/2009 | Supramaniam et al. |
| 7,483,979 B1 | 1/2009 | Prager |
| 7,487,535 B1 | 2/2009 | Isaacson et al. |
| 7,519,813 B1 | 4/2009 | Cox et al. |
| 7,584,502 B2 | 9/2009 | Alkove et al. |
| 7,591,005 B1 | 9/2009 | Moore |
| 7,617,501 B2 | 11/2009 | Peterson |
| 7,650,497 B2 | 1/2010 | Thornton et al. |
| 7,653,794 B2 | 1/2010 | Michael et al. |
| 7,661,027 B2 | 2/2010 | Langen et al. |
| 7,673,323 B1 | 3/2010 | Moriconi |
| 7,690,025 B2 | 3/2010 | Grewal et al. |
| 7,765,187 B2 | 7/2010 | Bergant et al. |
| 7,805,721 B2 * | 9/2010 | Feinleib et al. ............... 717/174 |
| 7,895,332 B2 | 2/2011 | Vanyukhin et al. |
| 7,904,949 B2 | 3/2011 | Bowers et al. |
| 7,987,455 B1 | 7/2011 | Senner et al. |
| 8,024,360 B2 | 9/2011 | Moore |
| 8,086,710 B2 | 12/2011 | Vanyukhin et al. |
| 8,087,075 B2 | 12/2011 | Peterson et al. |
| 2001/0034733 A1 | 10/2001 | Prompt et al. |
| 2002/0055949 A1 | 5/2002 | Shiomi et al. |
| 2002/0078005 A1 | 6/2002 | Shi et al. |
| 2002/0112178 A1 | 8/2002 | Scherr |
| 2002/0129274 A1 | 9/2002 | Baskey et al. |
| 2002/0133723 A1 | 9/2002 | Tait |
| 2002/0138572 A1 | 9/2002 | Delany et al. |
| 2002/0169986 A1 | 11/2002 | Lortz |
| 2002/0169988 A1 | 11/2002 | Vandergeest et al. |
| 2002/0174366 A1 | 11/2002 | Peterka et al. |
| 2002/0178377 A1 | 11/2002 | Hemsath et al. |
| 2002/0184536 A1 | 12/2002 | Flavin |
| 2003/0009487 A1 | 1/2003 | Prabakaran et al. |
| 2003/0018913 A1 | 1/2003 | Brezak et al. |
| 2003/0023587 A1 | 1/2003 | Dennis et al. |
| 2003/0033535 A1 | 2/2003 | Fisher et al. |
| 2003/0065940 A1 | 4/2003 | Brezak et al. |
| 2003/0065942 A1 | 4/2003 | Lineman et al. |
| 2003/0110397 A1 | 6/2003 | Supramaniam et al. |
| 2003/0115186 A1 | 6/2003 | Wilkinson et al. |
| 2003/0115313 A1 | 6/2003 | Kanada et al. |
| 2003/0115439 A1 | 6/2003 | Mahalingam et al. |
| 2003/0177388 A1 | 9/2003 | Botz et al. |
| 2003/0188036 A1 | 10/2003 | Chen et al. |
| 2003/0229783 A1 | 12/2003 | Hardt |
| 2004/0010519 A1 | 1/2004 | Sinn et al. |
| 2004/0059953 A1 | 3/2004 | Purnell |
| 2004/0078569 A1 | 4/2004 | Hotti |
| 2004/0088543 A1 | 5/2004 | Garg et al. |
| 2004/0098595 A1 | 5/2004 | Aupperle et al. |
| 2004/0098615 A1 | 5/2004 | Mowers et al. |
| 2004/0111515 A1 | 6/2004 | Manion et al. |
| 2004/0111643 A1 * | 6/2004 | Farmer ........................ 713/201 |
| 2004/0117382 A1 | 6/2004 | Houseknecht et al. |
| 2004/0123146 A1 | 6/2004 | Himmel et al. |
| 2004/0128542 A1 | 7/2004 | Blakley et al. |
| 2004/0139050 A1 | 7/2004 | Barrett et al. |
| 2004/0139081 A1 | 7/2004 | Barrett et al. |

| | | | |
|---|---|---|---|
| 2004/0199795 A1 | 10/2004 | Grewal et al. | |
| 2004/0260565 A1 | 12/2004 | Zimniewicz et al. | |
| 2004/0260651 A1 | 12/2004 | Chan et al. | |
| 2005/0010547 A1 | 1/2005 | Carinci et al. | |
| 2005/0055357 A1 | 3/2005 | Campbell | |
| 2005/0060397 A1 | 3/2005 | Barthram et al. | |
| 2005/0086457 A1 | 4/2005 | Hohman | |
| 2005/0091068 A1* | 4/2005 | Ramamoorthy et al. | 705/1 |
| 2005/0091213 A1 | 4/2005 | Schutz et al. | |
| 2005/0091250 A1 | 4/2005 | Dunn et al. | |
| 2005/0091284 A1 | 4/2005 | Weissman et al. | |
| 2005/0091290 A1 | 4/2005 | Cameron et al. | |
| 2005/0108579 A1 | 5/2005 | Isaacson et al. | |
| 2005/0114701 A1 | 5/2005 | Atkins et al. | |
| 2005/0125798 A1 | 6/2005 | Peterson | |
| 2005/0144463 A1 | 6/2005 | Rossebo et al. | |
| 2005/0193181 A1 | 9/2005 | Kaneda et al. | |
| 2005/0198303 A1 | 9/2005 | Knauerhase et al. | |
| 2005/0204143 A1 | 9/2005 | Ellington | |
| 2005/0223216 A1 | 10/2005 | Chan et al. | |
| 2005/0246554 A1* | 11/2005 | Batson | 713/194 |
| 2005/0267938 A1 | 12/2005 | Czeczulin | |
| 2005/0268309 A1 | 12/2005 | Krishnaswamy et al. | |
| 2005/0283443 A1 | 12/2005 | Hardt | |
| 2005/0283614 A1 | 12/2005 | Hardt | |
| 2006/0004794 A1 | 1/2006 | Pizzo et al. | |
| 2006/0005229 A1 | 1/2006 | Palekar et al. | |
| 2006/0010445 A1 | 1/2006 | Peterson et al. | |
| 2006/0021017 A1 | 1/2006 | Hinton et al. | |
| 2006/0026195 A1 | 2/2006 | Gu et al. | |
| 2006/0034494 A1 | 2/2006 | Holloran | |
| 2006/0085483 A1 | 4/2006 | Mooney et al. | |
| 2006/0116949 A1 | 6/2006 | Wehunt et al. | |
| 2006/0130065 A1 | 6/2006 | Chin et al. | |
| 2006/0161435 A1 | 7/2006 | Atef et al. | |
| 2006/0174350 A1 | 8/2006 | Roever et al. | |
| 2006/0184401 A1 | 8/2006 | DelGaudio et al. | |
| 2006/0200424 A1 | 9/2006 | Cameron et al. | |
| 2006/0200504 A1 | 9/2006 | Lo | |
| 2006/0224611 A1 | 10/2006 | Dunn et al. | |
| 2006/0248099 A1 | 11/2006 | Barrett et al. | |
| 2006/0265740 A1 | 11/2006 | Clark et al. | |
| 2006/0282360 A1 | 12/2006 | Kahn et al. | |
| 2006/0282461 A1 | 12/2006 | Marinescu | |
| 2006/0294151 A1 | 12/2006 | Wong et al. | |
| 2007/0011136 A1 | 1/2007 | Haskin et al. | |
| 2007/0038596 A1 | 2/2007 | Pizzo et al. | |
| 2007/0083917 A1 | 4/2007 | Peterson et al. | |
| 2007/0100980 A1 | 5/2007 | Kataoka et al. | |
| 2007/0101415 A1 | 5/2007 | Masui | |
| 2007/0143836 A1 | 6/2007 | Bowers et al. | |
| 2007/0150448 A1 | 6/2007 | Patnode | |
| 2007/0156766 A1 | 7/2007 | Hoang et al. | |
| 2007/0156767 A1 | 7/2007 | Hoang et al. | |
| 2007/0180448 A1 | 8/2007 | Low et al. | |
| 2007/0180493 A1 | 8/2007 | Croft et al. | |
| 2007/0192843 A1 | 8/2007 | Peterson | |
| 2007/0255814 A1 | 11/2007 | Green et al. | |
| 2007/0288992 A1 | 12/2007 | Robinson | |
| 2008/0104220 A1 | 5/2008 | Vanyukhin | |
| 2008/0104250 A1 | 5/2008 | Vanyukhin | |
| 2008/0133533 A1 | 6/2008 | Ganugapati et al. | |
| 2008/0162604 A1 | 7/2008 | Soulet et al. | |
| 2008/0215867 A1 | 9/2008 | Mackin et al. | |
| 2009/0006537 A1 | 1/2009 | Palekar et al. | |
| 2009/0216975 A1 | 8/2009 | Halperin et al. | |
| 2010/0050232 A1 | 2/2010 | Peterson | |
| 2011/0093570 A1 | 4/2011 | Mackin et al. | |
| 2011/0282977 A1 | 11/2011 | Peterson | |
| 2011/0283273 A1 | 11/2011 | Peterson | |

FOREIGN PATENT DOCUMENTS

| | | |
|---|---|---|
| WO | WO 2006/016900 | 2/2006 |
| WO | WO 2007/044613 A2 | 4/2007 |

OTHER PUBLICATIONS

Nov. 18, 2011, U.S. Appl. No. 95/001,458—Patent Owner Comments Regarding Oct. 20, 2011 Action Closing Prosecution, 14 pages.

Dennis, Disconnect Login (Was: FC3 Bug Week—Help Wanted) (Sep. 24, 2004).
Documentation for Kerberos V5 release krb5-1.3, Copyright 1985-2002, Installation Guide—System Administrator's Guide: UNIX User's Guide.
Garman, "Kerberos—The Definitive Guide," Aug. 2003, O'Reilly & Associates, Inc.
PADL Software Pty Ltd., Pam_ccreds readme, (Apr. 11, 2004) (pan_crreds).
U.S. Appl. No. 11/311,215, Amendment and Response to Office Action filed Jun. 14, 2010.
U.S. Appl. No. 11/311,215, Claims in "red-line" form as amended by the applicant which with the amendments by the Examiner resulted in the issuance of the Notice of Allowance.
U.S. Appl. No. 11/311,215, Claims in "red-line" form as amended by the Examiner resulted in the issuance of the Notice of Allowance.
U.S. Appl. No. 95/001,458, Inter Partes Reexamination Office Action, dated Jan. 21, 2011 of co-owned U.S. Patent No. 7,617,501.
Withers, Integrating Windows 2000 and UNIX Using Kerberos, The Journal for UNIX Systems Administrators, vol. 10, No. 12, Dec. 2001.
Microsoft: CATIA Migration from UNIX to Windows, Overview, Jul. 18, 2003. (3 pages).
Microsoft: CATIA Migration from UNIX to Windows, Overview, Jul. 18, 2003, Microsoft, Chapter 8, Windows-Unix Interoperability and Data Sharing. (21 pages).
*Windows 2000 Active Directory* by Alistair G. Lowe-Norris, Chapters 8 and 9, pp. 177-245, published Jan. 2000.
U.S. Appl. No. 95/001,458, Inter Partes Reexamination Request of co-owned U.S. Patent No. 7,617,501.
"Sun Enterprise Authentication Mechanism Data Sheet"pp. 1-4, 2004.
"PADL Software Pty Ltd," pp. 1-3, 2004.
David "Del" Elson, "Active Directory and Linux," pp. 1-11, 2002.
Apurva Kumar, "The OpenLDAP Proxy Cache," IBM, India Research Lab, at least as early as May 2003.
Antti Tikkanen, "Active Directory and nss_idap for Linux: Centralized User Management," printed from pp. 1-11, 2004.
John Brezak, "Interoperability with Microsoft Windows 2000 Active Directory and Kerberos Services," pp. 1-4, 2000.
"Replacing NIS with Kerberos and LDAP," pp. 1-2.
J. Brezak, "HTTP Authentication: SPNEGO Access Authentication as Implemented in Microsoft Windows 2000," pp. 1-6.
"Sadma," pp. 1-2.
"Directory Administrator," pp. 1-3.
"Project: AD4Unix: Summary," pp. 1-3, 2000.
"Lnux Authentication Against Active Directory," pp. 1-2.
"Kerberos Module for Apache,".
"NegotiateAuth,".
Turbo Fredriksson, "LDAPv3." pp. 2-65, 2001.
"LDAP Linux HOWTO," pp. 1-2.
U.S. Appl. No. 12/200,814, filed Aug. 28, 2008, Eyes et al.
A. Leonard, "Embrace, extend, censor", Originally published May 11, 2000 on salon.com.
AIX 5L Differences Guide Version 5.2 Edition Published Dec. 24, 2002, Excerpt.
Alan H. Harbitter et al., "Performance of Public-Key-Enabled Kerberos Authentication in Large Networks", Proceedings of the IEEE symposium on Security and Privacy. 2001.
Antti Tikkanen, "Active Directory and nss_idap for Linux: Centralized er Management," pp. 1-11, 2004.
Buell, D.A. et al., "Identity management", Internet Computing, IEEE vol. 7, Issue 6, Nov.-Dec. 2003 pp. 26-28.
Chapter 9 Authentication Protocols, Distributed System & Network Security Lab, Department of Computer Science & Information Engineering, National Chiao Tung University, pp. 21-22.
COSuser—Identity management and user provisioning for Unix, Linux and Microsoft Windows®.
Damiani, E., et al, "Managing multiple and dependable identities" Internet Computing, IEEE vol. 7, Issue 6, Nov.-Dec. 2003 pp. 29-37.
David F. Carr, "What's Federated Identity Management?", eWeek, Nov. 10, 2003.
Description of Digital Certificates, Jan. 23, 2007.

Designing Network Security Published May 7, 1999. Excerpt.
Documentation for Kerberos V5 release krb5-1.3, Copyright 1985-2002, Installation Guide.
Documentation for Kerberos V5 release krb5-1.3, Copyright 1985-2002, System Administrators Guide.
Documentation for Kerberos V5 release krb5-1.3, Copyright 1985-2002, UNIX User's Guide.
European Office Action, Application No. 05728119.8-1243 dated Apr. 9, 2009.
Fabini et al., "IMS in a Bottle: Initial Experiences from an OpenSER-based Prototype Implementation of the 3GPP IP Multimedia Subsystem" Mobile Business, 2006. ICMB '06. International Conference on Publication Date: 2006; on pp. 13-13.
Get to One Options for moving from multiple, Unix identities to a single, AD-based authentication infrastructure with Vintela Authentication Services.
Hank Simon, "SAML:The Secret to Centralized Identity Management", Dec. 2004.
Identity Management for UNIX.
Implementing Registry-Based Group Policy for Applications, Microsoft Windows 2000 Server. White Paper.
International Preliminary Report on Patentability and Written Opinion for International Application No. PCT/US2006/039302, mailed on Apr. 2, 2009, in 7 pages.
International Search Report in International Application No. PCT/US2006/039302, mailed on Jul. 3, 2008.
Introduction to Group Policy in Windows Server 2003, Microsoft Corporation, Published Apr. 2003.
J. Barr, "The Gates of Hades: Microsoft attempts to co-opt Kerberos", Published Apr. 2000 as verified by the Internet Archive.
J. Kohl et al. "RFC 1510: The Kerberos Network Authentication Service (V5)", Published Sep. 1993.
Jan De Clercq, "Win.NET Server Kerberos".
Kerberos, PACs, and Microsoft's Dirty Tricks Originally posted to slashdot.org on May 2, 2000.
Langella, S. et al., "Dorian: Grid Service Infrastructure for Identity Management and Federation", Computer-Based Medical Systems, 2006. CBMS 2006. 19th IEEE International Symposium on Jun. 22-23, 2006 pp. 756-761.
Li, M., et al., "Identity management in vertical handovers for UMTS-WLAN networks", Mobile Business, 2005. ICMB 2005. International Conference on Jul. 11-13, 2005 pp. 479-484.
LinuX® and Windows® Interoperability Guide, Published Dec. 14, 2001, Excerpt.
Matsunaga et al, "Secure Authentication System for Public WLAN Roaming, Proceedings of the 1st ACM international workshop on Wireless mobile applications and services on WLAN hotspots," San Diego, CA, A, Year of Publication: 2003, p. 113-121.
Matthew Hur, "Session Code: ARC241 architecture & infrastructure", Microsoft Corporation.
MCSE in a Nutshell: The Windows 2000 Exams Published Feb. 2001. Excerpt.
Mikkonen, H. et al., "Federated Identity Management for Grids" Networking and Services, 2006. ICNS '06. International conference on Jul. 16-18, 2006 pp. 69-69.
Mont, M.C. et al., "Towards accountable management of identity and privacy: sticky policies and enforceable tracing services", Database and Expert Systems Applications, 2003. Proceedings. 14th International Workshop on Sep. 1-5, 2003 pp. 377-382.
NCSA Introduction to Kerberos 5, All right reserved Board of Trustees of the University of Illinois Page last updated May 21, 2002.
Neuman et al., "RFC 4120—The Kerberos Network Authentication Service V5," Network Working Group, Jul. 2005.
Phiri, J. et al., "Modelling and Information Fusion in Digital Identity Management Systems" Networking, International Conference on Systems and International Conference on Mobile Communications and Learning Technologies, 2006. ICN/ICONS/MCL 2006. International Conference on Apr. 23-29, 2006 pp. 181-181.
Quest Software; "UNIX Identity Migration Wizard User Guide", 2006.
Radeke, E., et al. "Framework for object migration in federated database systems", Cooperation Univ. of Paderborn, Germany, Parallel and Distributed Information Systems, 1994., Proceedings of the Third International Conference on Publication Date: Sep. 28-30, 1994, on pp. 187-194.
RFC 4120—"The Kerberos Network Authentication Service V5," Neuman et al., Network Working Group, Jul. 2005.
Search Security, "Search Security.com Definitions", Jun. 4, 2007.
Shim, S.S.Y et al., "Federated identity management" Computer; vol. 38, Issue 12, Dec. 2005 pp. 120-122.
Shin, D. et al., "Ensuring information assurance in federated identity management", Performance, Computing, and Communications, 2004 IEEE International Conference on 2004 pp. 821-826.
Siddiqi, J. et al., "Secure ICT Services for Mobile and Wireless Communications: A Federated Global Identity Management Framework", Information Technology: New Generations, 2006. ITNG 2006. Third International Conference on Apr. 10-12, 2006 pp. 351-357.
Sixto Ortiz, Jr., "One-Time Password Technology", vol. 29, Issue 15, Apr. 13, 2007.
Subject 2.15. What do I need to do to setup cross-realm authentication?
The SLAPD and SLURPD Administrator's Guide, University of Michigan Release 3.3 Apr. 30, 1996.
Wedgetail Communications; "Security Assertion Markup Language (SAML)", 2004.
Weitzner, D.J., "In Search of Manageable Identity Systems", IEEE Internet Computing, vol. 10, Issue 6, Nov.-Dec. 2006 pp. 84-86.
Windows 2000 Kerberos Authentication White Paper, Microsoft Windows 2000 Server, pp. 1-5 and 41-42.
Quest Vintela Authentication Services, Administrator's Guide Version 3.1, 2006.
Akgar et al., Secure ICT Services for Mobile and Wireless Communications: A Federated Global Identity Management Framework, 2006 IEEE.
"Innovation Report—Windows Group Policy Protocols". Jul. 31, 2006.
"Optimization Techniques for Trusted Semantic Interoperation", Final Technical Report, Air Force Research Laboratory. Published May 1998.
Affidavit filed with Amendment and Response to Office Action filed Jan. 14, 2008 in U.S. Appl. No. 10/888,845.
Amendment and Response to Office Action filed on Jan. 14, 2008 with claims as amended in U.S. Appl. No. 10/888,845.
European Patent Office Communication pursuant to Article 94(3) EPC dated Apr. 9, 2009.
Microsoft Corp., Implementing Registry-Based Group Policy for Applications, 2000.
Microsoft Corp., Introduction to Group Policy in Windows Server 2003, 2003.
Neuman, et al.: "Kerberos: An Authentication Service for Computer Networks", IEEE Communications Magazine, vol. 32, Issue 9, Pub. Date Sep. 1994, relevant pp. 33-38.
Request for Withdrawal of the European Application No. 05728119.8 on Feb. 19, 2010.
Response to Communication pursuant to Article 94(3) EOC filed Sep. 9, 2009 in EP 05728119.8.
Sandrasegaran, Hsang, Identity Management in Vertical Handovers for UMTS-WLAN Networks, 2005 IEEE.
Summary of telephonic interview involving co-inventor Matthew Peterson and three others plus the Examiner on Nov. 16, 2007 in U.S. Appl. No. 10/888,845.
Accelerated Examination Support Document in U.S. Appl. No. 13/198,592, filed Aug. 4, 2011.
Accelerated Examination Support Document in U.S. Appl. No. 13/198,629, filed Aug. 4, 2011.
Transcript of Jul. 22, 2011 deposition of Michael W. Dennis in *Quest Software, Inc.* v. *Centrify Corporation and Likewise Software, Inc.*, Case No. 2:10-CV-00859-TS, United States District Court for the District of Utah, Central Division.
Vintela Extends the Reach of Microsoft Group Policy to Unix and Linux; Vintela Group Policy (VGP) Provides a Framework for Unix and Linux Policy-Based Management Through the Popular Windows Group Policy System., PR Newswire, Sep. 13, 2004.

Centrify Corporation's Answer and Affirmative Defenses, *Quest Software, Inc.* v. *Centrify Corporation and Likewise Software, Inc.*, Case No. 2:10-CV-00859-TS, United States District Court for the District of Utah, Central Division.

Complaint, *Quest Software, Inc.* v. *Centrify Corporation and Likewise Software, Inc.*, Case No. 2:10-CV-00859-TS, United States District Court for the District of Utah, Central Division.

Declaration of Matthew Peterson in Support of Quest's Opposition to Centrify's Motion to Transfer Venue to the Northern District of California, *Quest Software, Inc.* v. *Centrify Corporation and Likewise Software, Inc.*, Case No. 2:10-CV-00859-TS, United States District Court for the District of Utah, Central Division.

International Search Report and Written Opinion from International Patent Appl. No. PCT/US2009/038394, mailed Oct. 6, 2009, in 13 pages.

International Search Report PCT/US2005/008342 , mailed on Nov. 9, 2006.

Likewise Software, Inc.'s Answer, Affirmative Defenses and Counterclaims, *Quest Software, Inc.* v. *Centrify Corporation and Likewise Software, Inc.*, Case No. 2:10-CV-00859-TS, United States District Court for the District of Utah, Central Division.

Memorandum Decision and Order Denying Defendant Centrify Corporation's Motion to Transfer Venue and Motion to Stay Pending Inter Partes Reexamination, *Quest Software, Inc.* v. *Centrify Corporation and Likewise Software, Inc.*, Case No. 2:10-CV-00859-TS, United States District Court for the District of Utah, Central Division.

Memorandum in Support of Centrify's Motion to Stay Pending Inter Partes Reexamination, *Quest Software, Inc.* v. *Centrify Corporation and Likewise Software, Inc.*, Case No. 2:10-CV-00859-TS, United States District Court for the District of Utah, Central Division.

Quest Software, Inc.'s Opposition to Motion to Stay, *Quest Software, Inc.* v. *Centrify Corporation and Likewise Software, Inc.*, Case No. 2:10-CV-00859-TS, United States District Court for the District of Utah, Central Division Feb. 10, 2012.

Reply Memorandum in Support of Centrify's Motion to Stay Pending Inter Partes Reexamination, *Quest Software, Inc.* v. *Centrify Corporation and Likewise Software, Inc.*, Case No. 2:10-CV-00859-TS, United States District Court for the District of Utah, Central Division.

Stipulated Judgment and Entry of Permanent Injunction against Likewise Software, Inc., *Quest Software, Inc.* v. *Centrify Corporation and Likewise Software, Inc.*, Case No. 2:10-CV-00859-TS, United States District Court for the District of Utah, Central Division.

Vintela Group Policy Technology Preview, "Extending the Power of Group Policy and Windonws Active Directory to configuration of Unix and Linux users and systems", Version 0.1, May 2004.

Aelita Software Domain Migration Wizard 6.0 User's Guide, Aug. 21, 2003.

Centrify DirectControl Administrator's Guide Version 2.0, Aug. 15, 2005.

* cited by examiner

700 

| Policy Template Data |
|---|
| CLASS MACHINE<br>CATEGORY "VAS"<br>   KEYNAME "SOFTWARE\Policies\VGP\VAS"<br>   CATEGORY "Users Allow and Deny"<br>     KEYNAME "SOFTWARE\Policies\VGP\VAS\UsersAllowDeny"<br>     POLICY "Modify Users Allow"<br>       KEYNAME "SOFTWARE\Policies\VGP\VAS\UsersAllowDeny"<br>       PART "Add user principal names, groups, or realms:" LISTBOX<br>         KEYNAME "SOFTWARE\Policies\VGP\VAS\UsersAllowDeny\Allow"<br>         VALUEPREFIX "Allow"<br>       END PART<br>     END POLICY    710 |

| Policy Manager Input Data |
|---|
| SOFTWARE\Policies\VGP\VAS\UsersAllowDeny\Allow;Allow1;1;james<br>SOFTWARE\Policies\VGP\VAS\UsersAllowDeny\Allow;Allow2;1;jill<br>SOFTWARE\Policies\VGP\VAS\UsersAllowDeny\Allow;Allow3;1;johnny    720 |

| Native Policy-related File Data |
|---|
| Preg....[.S.O.F.T.W.A.R.E.\.P.o.l.i.c.i.e.s.\.V.G.P.\.V.A.S.\.U.s.e.r.s.A.l.l.o.w.D.e.n.y.\<br>.A.l.l.o.w...;.A.l.l.o.w.1...;....;.j.a.m.e.s...].[.S.O.F.T.W.A.R.E.\.P.o.l.i.c.i.e.s.\.V.G.P.\.V.A.S.\<br>.U.s.e.r.s.A.l.l.o.w.D.e.n.y.\.A.l.l.o.w...;.A.l.l.o.w.1...;....;.j.i.l.l...].[.S.O.F.T.W.A.R.E.\.P.o.l.i.c.i.e.s.\<br>.V.G.P.\.V.A.S.\.U.s.e.r.s.A.l.l.o.w.D.e.n.y.\.A.l.l.o.w...;.A.l.l.o.w.1...;....;.j.o.h.n.n.y...]    730 |

| Translated Policy-related File Data |
|---|
| james<br>jill<br>johnny    740 |

FIG. 7

SYSTEMS AND METHODS FOR MANAGING POLICIES ON A COMPUTER

RELATED APPLICATION

This application is a continuation of U.S. patent application Ser. No. 10/888,845, filed Jul. 9, 2004, which is hereby incorporated herein by reference in its entirety.

BACKGROUND

1. Field of the Invention

This invention relates to managing groups of computers and more particularly relates to managing policies for configuring hardware or software settings on groups of computers with a plurality of operating systems.

2. Description of the Related Art

A major concern of information technology management in corporations and other organizations has been balancing the complexity associated with managing large numbers of computers with the needs of individual users as they try to accomplish their tasks. A heterogeneous set of computer hardware, operating systems, and application software creates complexity and increased costs, but various combinations of hardware, operating systems, and software provide technical advantages when used as user workstations, departmental servers, corporate infrastructure equipment, and the like. User workstations are particularly difficult to manage when various needs and preferences of individual users are accommodated. For example, an engineer may require the use of a CAD system that runs only on the UNIX operating system, where other corporate users may be standardized on the MICROSOFT WINDOWS operating system and associated applications. Many similar compatibility issues exist among current computer systems.

One factor that adds to the complexity of managing various operating systems is that different operating systems employ different techniques for setting configuration information. For example, MICROSOFT WINDOWS and applications that run on Windows typically use a database, called the registry, to store configuration information. Computers running the UNIX operating system or derivatives thereof such as LINUX typically store configuration information in plain text files in particular locations in the file system directory. Information technology managers within an organization that uses heterogeneous operating systems typically institute separate sets of management procedures and standards for each operating system used in the organization.

One component of prior art solutions to the problem of managing large numbers of computers and users is the use of policies. Policies are used to set configurable options associated with an operating system or application program for a group of computer users. For example, a word processing program may have an option to select an American English dictionary or a British English dictionary. By creating one policy for its users in the United States and another policy for its users in England, an organization can set the appropriate option for all users without configuring each user's computer individually.

Another component of prior art solutions to the problem of managing groups of computers and users is the use of network directory services. Directory services provide an infrastructure to store and access information about network-based entities, such as applications, files, printers, and people. Directory services provide a consistent way to name, describe, locate access, manage, and secure information about these resources. The directories associated with directory services are typically hierarchical structures such as a tree with each node in the hierarchy capable of storing information in a unit often referred to as a container. Enterprises may use directory servers and directory services to centrally manage data that is accessed from geographically dispersed locations.

For example, corporations typically create network directory trees that mirror their corporate organizations. Information about individual employees, such as their employee number, telephone number, and hire date may be stored in a user object corresponding to each user in the directory tree. An organizational unit container representing each department may contain the user objects associated with each employee in the department. Organizational unit objects associated with each corporate division may contain the department organizational unit objects associated with each department in the division. Finally, an organization container representing the corporation as a whole may contain the company's division organizational unit objects.

Combining the use of policies and directory services facilitates management of groups of computers and users. Policies may be associated with the various containers in the directory services tree to store associated configuration information at the organization, division, or departmental level. For example, a policy may be associated with the Accounts Receivable container in a corporate organization to set options for the accounting program used in that department. Exceptions to the policy can be managed on an individual level, or by creating a group object and associating a policy with the group. Suppose, for example, that all employees in an organization use a software application with a particular set of configuration options, but department managers require a different set of options. A policy could be created with the basic set of options and associated with the organization container. A separate policy with the configuration options for managers could be created and assigned to a Managers user group object.

Using policies and directory services in combination has proven efficient in homogeneous operating system environments. Prior art computer management systems use policies targeted toward a specific operating system, referred to as the native operating system. From the point of view of prior art policy and policy management systems, other operating systems are considered to be foreign operating systems. However, the operating requirements of many organizations require information technology managers to manage multiple operating systems. The efficiencies associated with policies and directory services have not been realized in heterogeneous operating system environments. Since different operating systems use different approaches to setting configuration information, a policy associated with a directory services container may be applied to users of a native operating system that provided the policies, but there may not be a method for applying the policy for users of a foreign operating system.

From the foregoing discussion, it should be apparent that a need exists for an apparatus, system, and method that extend the use of policies to manage configuration information on computers having operating systems that are foreign to the policy creation and management environment. Beneficially, such an apparatus, system, and method would control cost and complexity associated with management of computers with heterogeneous operating systems within an organization. The benefits are multiplied when network directory services are used in conjunction with policies.

SUMMARY

The present invention has been developed in response to the present state of the art, and in particular, in response to the problems and needs in the art that have not yet been fully solved by currently available policy management systems. Accordingly, the present invention provides an apparatus, system, and method for managing policies on a computer having a foreign operating system that overcome many or all of the above-discussed shortcomings in the art.

In one aspect of the present invention, a method for managing policies on a computer having a foreign operating system includes providing a policy on a first computer with a native operating system, receiving the policy on a second computer with a foreign operating system, and translating the policy to configuration information usable on the second computer. In one embodiment, the method includes receiving the policy on the second computer at workstation start-up. The method also may include updating the policy at user login. These embodiments facilitate obtaining the current policy at the time they are typically needed by operating systems.

In further embodiments, the method includes polling the first computer at periodic intervals for changes to the policy. In these embodiments, configuration information usable on the second computer is updated to reflect changes in policy on the first computer, to keep the configuration information and policy closely synchronized. The method may also con include applying configuration information associated with directory services containers and objects. For example, a policy associated with a directory services organization container may be translated to configuration information that may then be applied to all users in the organization container.

In another aspect of the present invention, an apparatus to manage policies on a computer having a foreign operating system includes a policy on a first computer having a native operating system, a policy translator that translates the policy to configuration information usable on a second computer having foreign operating system, and a translator manager that manages the association between the policy on the first computer and the translator on the second computer. The apparatus, in one embodiment, is configured to manage configuration information usable on a second computer having a foreign operating system by means of policies on a first computer having a native operating system. A translator manager manages the association between the policy on the first computer, and a policy translator on the second computer.

The apparatus is further configured, in one embodiment, to include policies associated with network directory services containers and objects. Policies may be associated, for example, with organization containers, organizational unit containers, and user objects, facilitating the configuration of hardware or software information for groups of computer users at a corporate, department, or individual level.

Various elements of the present invention may be combined into a system arranged to carry out the functions or steps presented above. In one embodiment, the system includes two computers, the first having a native operating system and the second having a foreign operating system. In particular, the system, in one embodiment, includes a directory services server and database, a communications network, a policy, a policy editor, a policy template, a translator manager, and a policy translator.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 7 is a text diagram illustrating one embodiment of policy translation example data in accordance with the present invention.

DETAILED DESCRIPTION OF THE PREFERRED EMBODIMENTS

Figure 1:
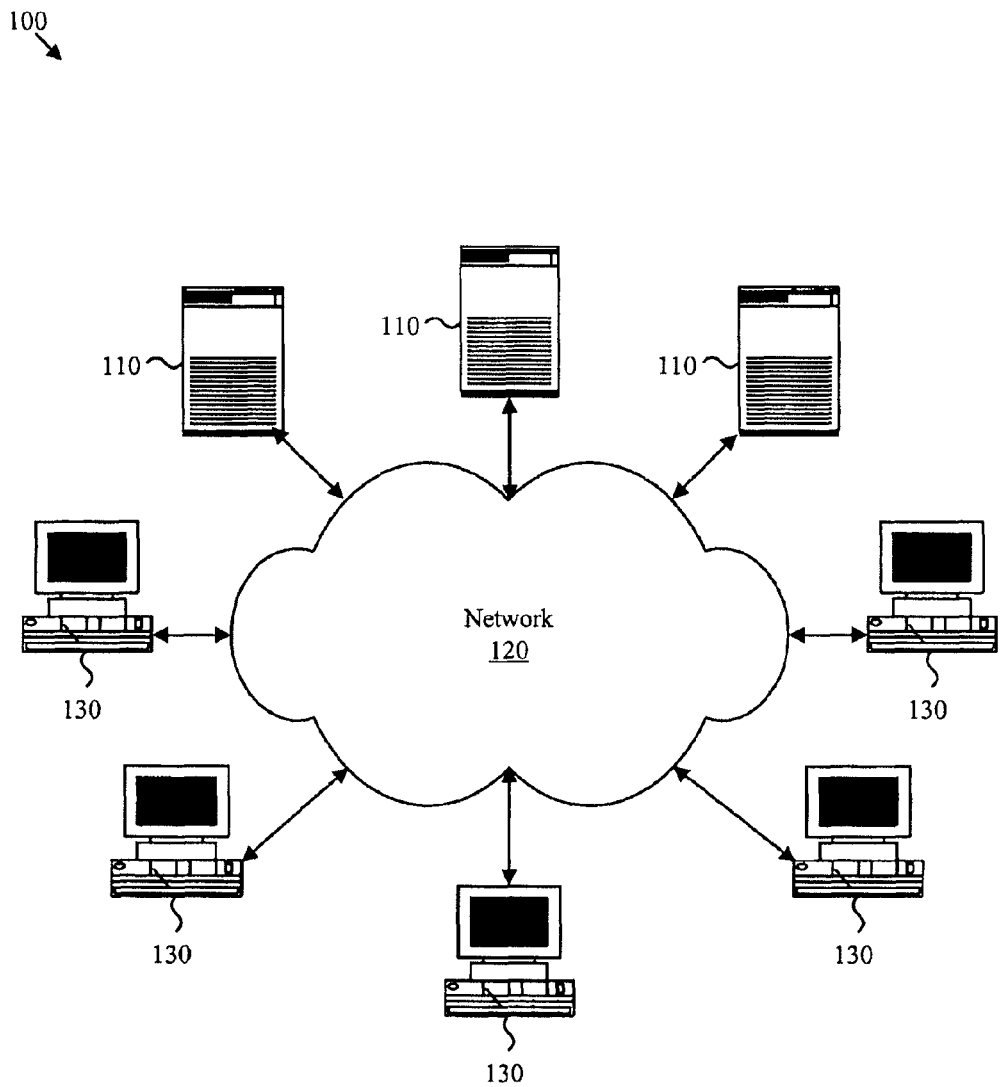
FIG. 1 is a schematic block diagram depicting one embodiment of a typical prior art networking environment wherein the present invention may be deployed.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

FIG. 1 depicts one embodiment of a typical prior art networking environment 100 that demonstrates the issues regarding managing currently deployed enterprises. As depicted, the networking environment 100 includes one or more servers 110, a network 120, and one or more networked computers 130. The components of the networking environment 100 may reside at a single site or may be dispersed over multiple sites.

Some of the servers 110 may be directory servers or domain servers which can function as a registry for resources and users of the networking environment 100. The network 120 may include routers, bridges, hubs, gateways, or the like which facilitate communications among the components of the networking environment 100. Some of the networked computers 130 may execute legacy applications and operating systems that are unable to integrate with the servers 110 that are directory servers.

Some of the networked computers 130 may be used to run utility applications to manage the servers 110 that are directory servers and features of the directory service that runs on the servers 110. These networked computers 130 that manage the directory service typically do not include functionality to manage foreign operating systems that may run on other networked computers 130.

Figure 2:
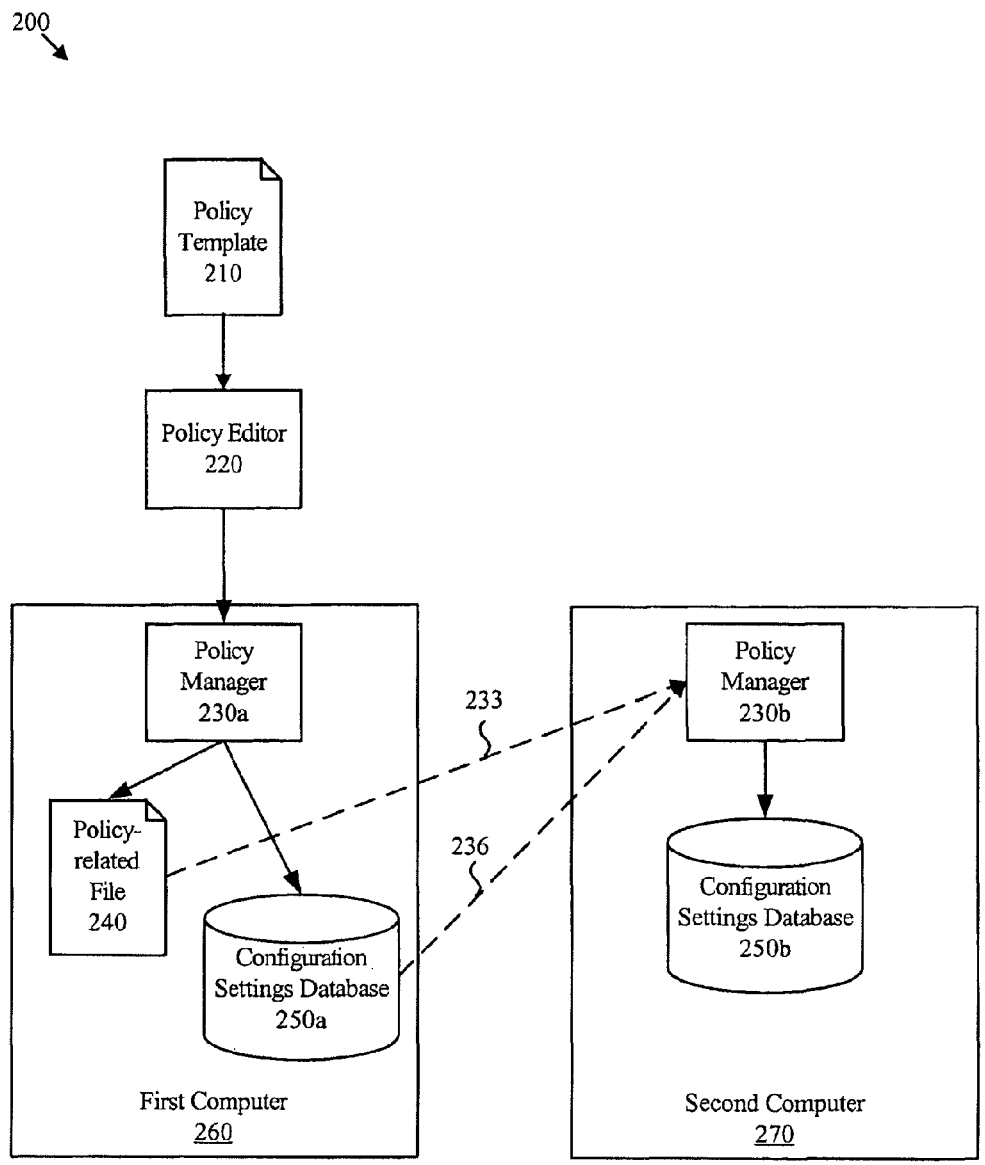
FIG. 2 is a schematic block diagram illustrating one embodiment of a prior art policy management apparatus.

FIG. 2 is a schematic block diagram illustrating one embodiment of a prior art policy management apparatus 200. The prior art policy management apparatus 200 includes a policy template 210, a policy editor 220, a first computer 260 having a native operating system, and a second computer 270 having the same native operating system. The first computer 260 includes a policy manager 230a, a policy-related file 240, and a configuration information database 250a. The second computer 270 includes a policy manager 230b, and a configuration information database 250b. This apparatus is configured to efficiently manage a group of computers having like operating systems.

An administrative user may use a policy template 210 and a policy editor 220 to control the operation of the policy manager 230a. The policy template 210 and the policy editor 220 may be located on the first computer 260 or may be on another computer. The policy manager 230a may use a policy-related file 240 and settings (i.e. information) in a configuration information database 250a to record the policy settings created by the administrative user.

As a means for efficiently managing a group of computers with like operating systems, a policy manager 230b in a second computer 270 may be configured to obtain policy settings by reading from the policy-related file 240 or the configuration information con database 250a on the first computer 260, as represented by the dashed lines 233 and 236 in FIG. 2. The policy manager 230b may then make settings to the configuration information database 250b on the second computer 270.

The policy may include configuration information that applies specifically to the second computer 270, or to a specific user or any of a group of users of the second computer 270. Configuration information may be associated with network directory services containers and objects. For example, by associating configuration information with an organizational unit container, the behavior of an application can be controlled for all users in a company department. Configuration information maybe assigned to containers and objects at various levels in a directory services hierarchy, facilitating management of hardware and software configuration information at various organizational, geographical, or individual levels. For example, application configuration information may be associated with an organization container, organizational unit container, and user object in a network directory services hierarchy, resulting in application configuration options being assigned at corporate, departmental, and individual levels in an organization.

Figure 3:
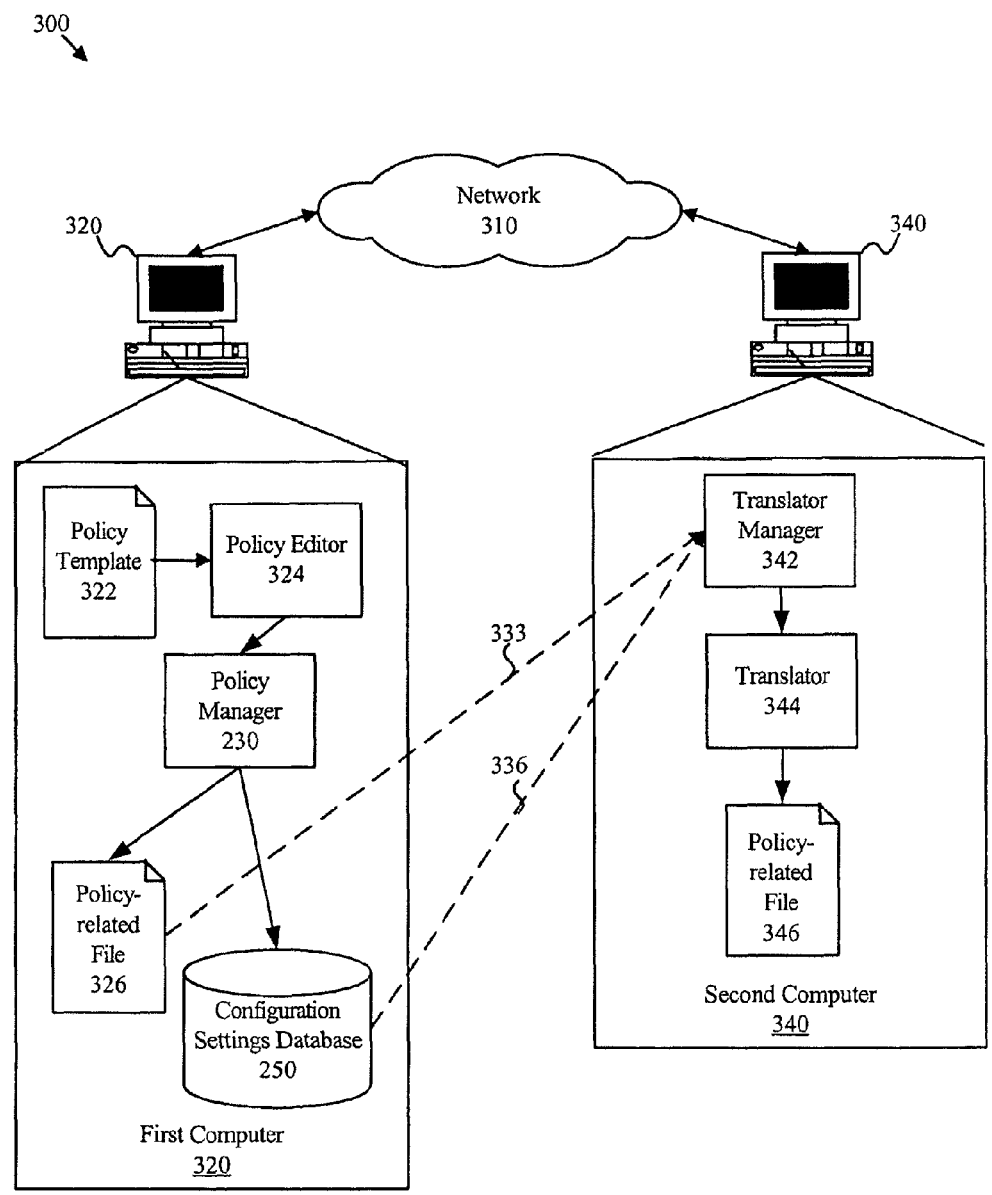
FIG. 3 is a schematic block diagram illustrating one embodiment of a policy management system in accordance with the present invention.

FIG. 3 is a schematic block diagram illustrating one embodiment of a policy management system 300 in accordance with the present invention. The depicted policy management system 300 includes a network 310, a first computer 320, and a second computer 340. The first computer 320 includes a policy template 322, a policy editor 324, a policy manager 230, a policy-related file 326, and a configuration information database 250. The depicted second computer 340 includes a translator manager 342, a translator 344, and a policy-related file 346. The policy management system 300 facilitates management of a group of computers with multiple operating systems by using the first computer 320 as a reference computer from which configuration information are replicated to other computers in a workgroup, or the like. The policy management system 300 depicted in FIG. 3 represents a peer-oriented embodiment of the present invention, where the first computer 320 and the second computer 340 are workstations, and no server is required.

An administrative user may use a policy template 322 and policy editor 324 to control the operation of the policy manager 230. The policy manager 230 may use a policy-related file 326 and settings or information in a configuration information database 250 to record the policy settings created by the administrative user. The translation manager 342 in the second computer 340 may be configured to obtain policy settings by reading from the policy-related file 326 and the configuration information database 250 on the first computer 320, as represented by the dashed lines 333 and 336 in FIG. 3. The translation manager 342 then passes the policy settings obtained from the first computer 320 to the translator 344 to translate to configuration information that may be stored in a policy-related file 346 on the second computer 340. In some embodiments, the translator 344 modifies configuration information stored in a plurality of files. The policy-related file 346 may not be exclusively dedicated to storing policy information. For example, the policy-related file 346 may contain non-policy data or code. In some embodiments, the operating system on the first computer 320 may provide an event notification system that notifies the translation manager 342 that changes have been made to the policy-related file 326 or the configuration information database 250.

Figure 4:
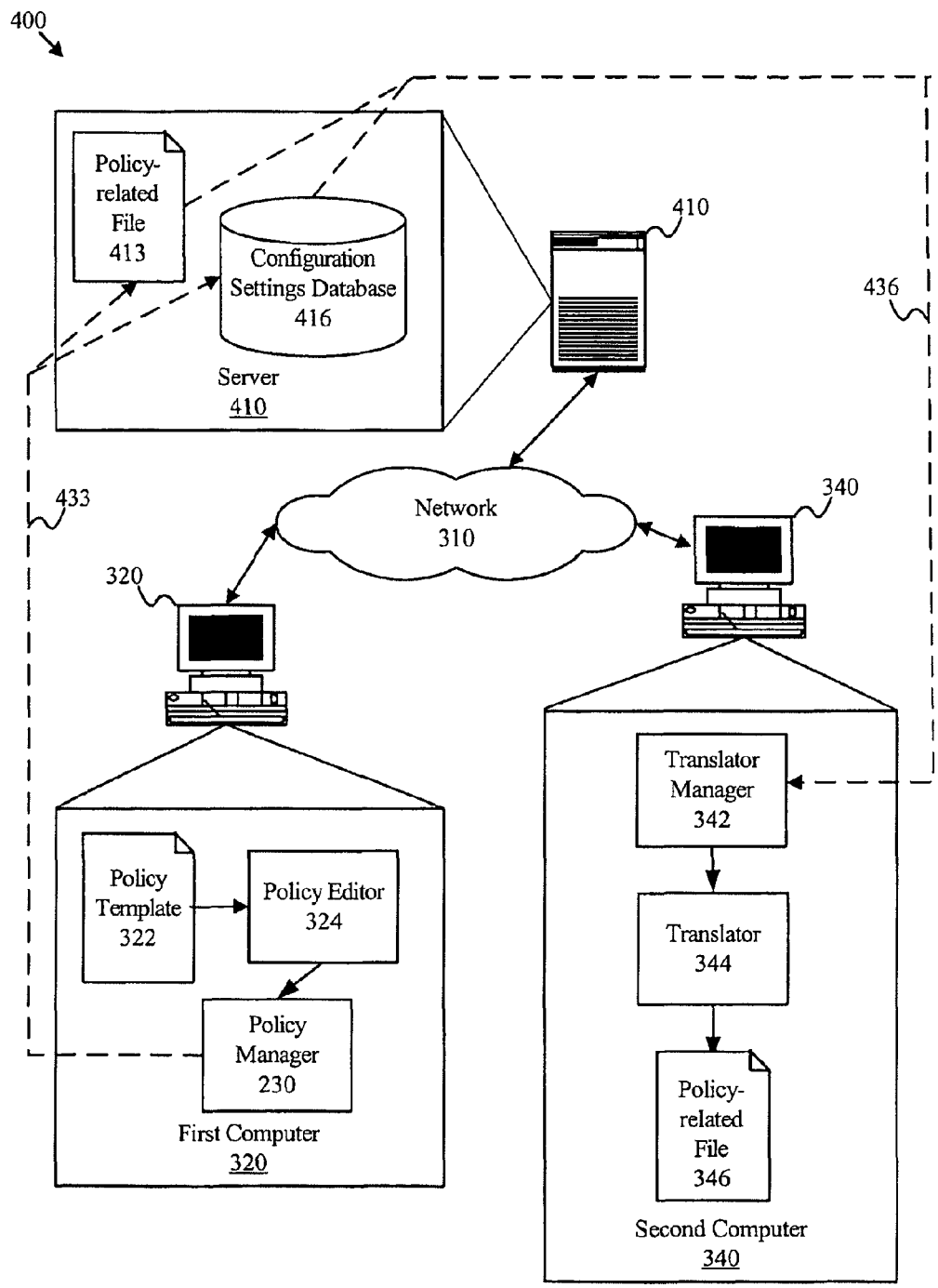
FIG. 4 is a schematic block diagram illustrating another embodiment of a policy management system in accordance with the present invention.

FIG. 4 is schematic block diagram illustrating another embodiment of a policy management system 400 in accordance with the present invention. The policy management system 400 includes a server 410, network 310, a first computer 320, and a second computer 340. The server 410 includes a policy-related file 413, and a configuration information database 416. The first computer 320 includes a policy template 322, a policy editor 324, and a policy manager 230. The second computer 340 includes a translation manager 342, a translator 344, and a policy-related file 346. The policy management system 400 facilitates management of a group of computers having multiple operating systems by replicating configuration information from a server 410, such as a directory server. The policy management system 400 depicted in FIG. 4 represents a client-server-oriented embodiment of the present invention, where configuration information are stored on a server 410 and replicated to client workstations represented by the second computer 340.

As with the embodiment depicted in FIG. 3, an administrative user may use a policy template 322 and policy editor 324 to control the operation of the policy manager 230. In this embodiment, however, the policy manager 230 may use a policy-related file 413 and settings in a configuration information database 416 to record the policy settings created by the administrative user on a server 410. The translation manager 342 in the second computer 340 may be configured to obtain policy settings by reading from the policy-related file 413 and the configuration information database 416 on the server 410, as represented by the dashed lines 433 and 436 in FIG. 4. The translation manager 342 then passes the policy settings obtained from the first computer 320 to the translator 344 to translate to configuration information that may be stored in a policy-related file 346 on the second computer 340.

The following schematic flow chart diagrams that follow are generally set forth as logical flow chart diagrams. As such, the depicted order and labeled steps are indicative of one embodiment of the presented method. Other steps, methods, and orderings may be conceived that are equivalent in function, logic, or effect to one or more steps, or portions thereof, of the illustrated method.

Figure 5:
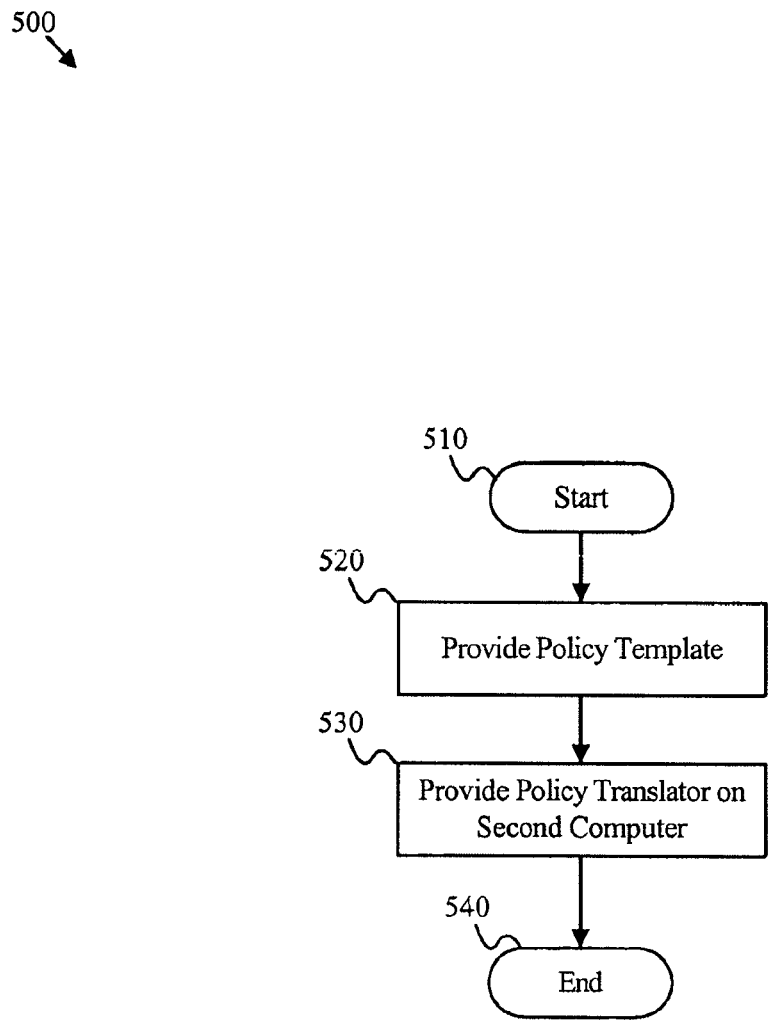
FIG. 5 is a schematic flow chart diagram illustrating one embodiment of a provide translator method in accordance with the present invention.

FIG. 5 is a schematic flow chart diagram illustrating one embodiment of a provide translator method 500 in accordance with the present invention. The provide translator method 500 includes a provide policy template step 520, and a provide policy translator step 530. The provide translator method 500 provides modules that facilitate translation of policy settings from a native operating system to a foreign operating system.

The provide policy template step 520 provides a policy template such as the policy template 322 to be used in conjunction with the policy editor 324, or the like. As detailed in FIG. 3 and elsewhere, the policy template 322 constrains policy editing, such that policies created by the policy editor 324 conform to requirements of the first computer 320. For example, the policy template 322 may ensure that configuration information car delivered to the policy manager 230 conform to a required syntax, or that numerical values fall within a meaningful range. The provide policy template step 520 may provide a plug-in module to an operating system utility program. In some embodiments, the provide policy template step 520 provides a wizard program module that guides a user through the process of creating a policy.

The provide policy translator step 530 provides a translator 344 that translates configuration information from the first computer 320 having a native operating system to the second computer 340 having a foreign operating system. The provide policy translator step 530 may place the translator 344 in a file system directory known to the translator manager 342. In some embodiments, the provide policy translator step 530 may register the file system location of the translator 344 with the translator manager 342. Upon completion of the provide policy translator step 530, the provide translator method 500 ends 540.

Figure 6:
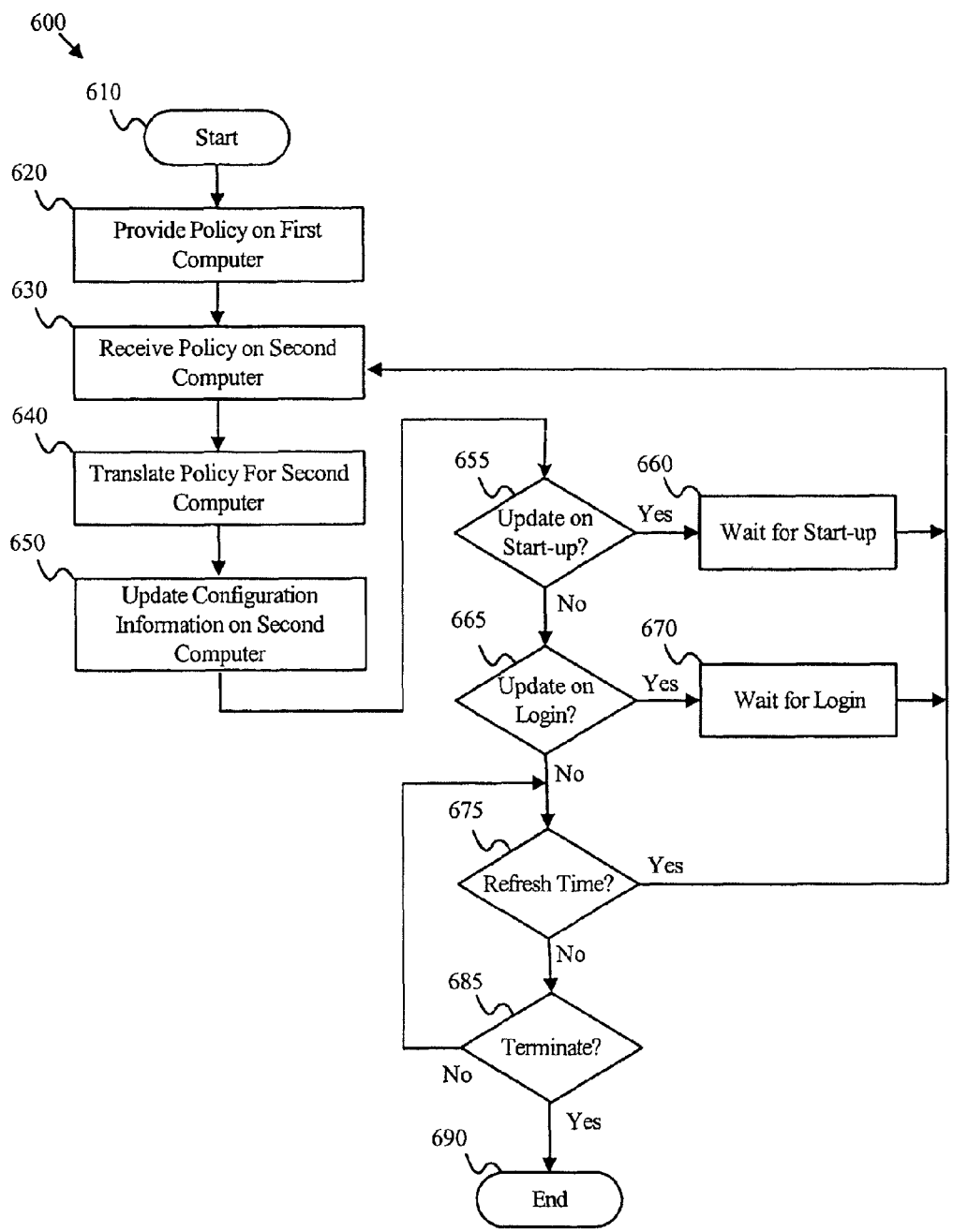
FIG. 6 is a schematic flow chart diagram illustrating one embodiment of a policy translation method in accordance with the present invention.

FIG. 6 is a schematic flow chart diagram illustrating one embodiment of a policy translation method 600 in accordance with the present invention. The policy translation method 600 includes a provide policy step 620, a receive policy step 630, a translate policy step 640, an update configuration step 650, an update on start-up test 655, a wait for start-up step 660, an update on login test 665, a wait for login step 670, a refresh time test 675, and a terminate test 685. The policy translation method 600 translates policies on a first computer 320 having a native operating system to policies for a second computer 340 having a foreign operating system.

The provide policy step 620 provides a policy on the first computer 320 having a native operating system. The provide policy step 620 may be performed by an administrative user using a policy template 322, policy editor 324, and/or policy manager 230. The policy may be contained in a policy-related file 326 and a configuration information database 250 on the first computer 320. In some embodiments, the policy may be contained in a policy-related file 413 and a configuration information database 416 on a server 410, such as a directory server.

The receive policy step 630 receives the policy on the second computer 340 having a foreign operating system. The receive policy step 630 may be performed by a translator manager 342 on the second computer 340. The translator manager 342 may copy the policy from a policy-related file 326 and a configuration information database 250 on the first computer 320. In other embodiments, the translator manager 342 may copy the policy from a policy-related file 413 and a configuration information database 416 on a server 410, such as a directory server. The translator manager 342 transmits the policy to a translator 344.

The translate policy step 640 translates configuration information from the first computer 320 having a native operating system to the second computer 340 having a foreign operating system. The translate policy step 740 may be performed by a translator 344 on the second computer 340. The translator 344 receives the policy from the translator manager 342 and translates the policy to foreign operating system configuration information used by the second computer 340.

The update configuration step 650 applies the configuration information translated by the translator 344. The update configuration step 650 may be performed by a translator 344 on the second computer 340 having a foreign operating system. After translating the policy to foreign operating system configuration information, the translator 344 applies the policy by saving the configuration information in a policy-related file 346. In some embodiments, configuration information may be saved in a plurality of policy-related files 346.

The update on start-up test 655 determines whether the policy is to be applied at workstation start-up. A policy may contain configuration information for all users of the second computer 340. Many operating systems apply configuration information at workstation start-up. Updating configuration information on the second computer 340 during workstation start-up makes the updated settings available for application during the workstation start-up process. If the policy is to be updated at workstation start-up, the policy translation method 600 continues with the wait for start-up step 660, otherwise the policy translation method 600 continues with the update on login test 665.

The wait for start-up step 660 waits for the second computer 340 to reach a point in the workstation start-up process where computer resources are available for the second computer 340 to receive the policy from the first computer 320. The wait for start-up step 660 includes setting a configuration setting that causes the policy translation method 600 to continue with the receive policy step 630 at workstation start-up. The wait for start-up step 660 facilitates receiving the current version of the policy so that configuration information may be applied to the second computer 340 at workstation start-up, when many operating systems typically read configuration information. Updating a policy at workstation start-up is particularly advantageous to workstation-specific configuration information.

The update on login test 665 determines whether the policy is to be applied at user login. A policy may contain configuration information that applies to a specific user or any of a group of users of the second computer 340. In some embodiments, configuration information may be associated with network directory services containers and objects. For example, by associating configuration information with an organizational unit container, the behavior of an application can be controlled for all users in a company department. Updating configuration information on the second computer 340 makes the current version of the settings available for application for the user logging in. If the policy is to be updated at user login, the policy translation method 600 continues with the wait for login method 670, otherwise the policy translation method 600 continues with the refresh time test 675.

The wait for login step 670 waits for a user to log in to the second computer 340 to receive the policy from the first computer 320. The wait for login step 670 includes setting a configuration setting that causes the policy translation method 700 to continue with the receive policy step 630 at user login. The wait for login step 670 facilitates receiving the current version of the policy so that configuration information may be applied to the second computer 340 at user login, when many operating systems typically read configuration information. Updating a policy at user login is particularly advantageous to user-specific configuration information.

The refresh time test 675 determines whether it is time to check for updates to the policy on the first computer 320. In some embodiments, the refresh time test 675 polls the first computer 320 at periodic intervals for changes to the policy. The polling interval may be configurable by the user or may itself be a setting configurable by a policy. In some embodiments, the refresh time test 675 may include a means for the first computer 320 to notify the second computer 340 that a change has been made to the policy, and that the policy should be refreshed on the second computer 340. If the refresh time has arrived, the policy translation method 600 continues with the receive policy step 630, otherwise it continues with the terminate test 685.

The terminate test 685 determines whether the refresh time test 675 should be repeated, or if the policy translation method 600 should terminate. In some embodiments, the policy translation method 600 may be terminated to facilitate deallocation of memory or other computer resources when the second computer 340 is shut down, or to allow for system maintenance. If the policy translation method is not to be terminated, it continues with the refresh time test 675, otherwise it ends 690.

FIG. 7 is a text diagram illustrating one embodiment of policy translation example data in accordance with the present invention. The policy translation example data 700 includes policy template data 710, policy manager input data 720, native policy-related file data 730, and translated policy-related file data 740. The policy translation example data may be generated in accordance with the policy translation method 600 and the policy management system 300.

The policy template data 710 is one example of the policy template 322. The policy template 322 may reside on the first computer 320 having a native operating system or on a third computer, such as an administrative workstation. The policy template data 710 may comprise plain ASCII text used to constrain data input accepted by the policy editor 324 by identifying names of data objects that the policy editor 324 will allow the user to edit. Policy template data 710 may also contain the text of prompts or other fields that control the user interface presented by the policy editor 324. Using the policy template 322, the policy editor 324 may accept input from an administrative user and generate input data for the policy manager 230.

Policy manager input data 720 illustrates the format of data that may be generated by the policy editor 324. In various embodiments, in accordance with the provide policy step 620, the policy manager 230 may accept the policy manager input data 720 from a file created by the policy editor 324, from a file created by an administrative user, or communicated directly from the policy editor 324 to the policy manager 230 via interprocess communication. The policy manager 230 may alter the format or contents of the policy manager input data 720. In some embodiments, the policy manager creates a policy-related file 326 and enters the location of the policy-related file 326 in the configuration settings database 250.

The native policy-related file data 730 is a textual representation of binary data in one embodiment of the policy-related file 326. The native policy-related file data 730 is generated by the policy manager 230, and in preparation for the receive policy step 630, is stored in a format and location typically used with the native operating system in use on the first computer 320. In the depicted embodiment, the native policy-related file data 730 comprises mixed binary and UNICODE text delimited by square brackets.

The translated policy-related file data 740 is one example of the policy-related file 346. In accordance with the translate policy step 640, the translator 344 translates the policy data received from the translator manager 342 to data usable by the foreign operating system used by the second computer 340. The depicted translated policy-related file data 740 is one example of a configuration file that a translator 344 has converted from mixed binary and UNICODE format to plain ASCII text format, and filtered to include only data usable by the foreign operating system in use on the second computer 340. In the depicted example, the translated policy-related file data 740 comprises a list of user names that will be allowed to log in to the second computer 340.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system comprising:
    a Unix computer having a Unix operating system, a tangible storage medium, and a computer processor;
    a translator manager stored in the tangible storage medium; and
    a translator stored in the tangible storage medium, wherein the Unix computer is configured to be connected to a heterogeneous computer network having computers with multiple operating systems, including at least the Unix computer and a Windows computer that cannot natively manage configuration information on the Unix computer, so as to transform the heterogeneous computer network into a transformed heterogeneous computer network in which the Windows computer uses Windows native policies to manage configuration information on the Unix computer, wherein the transformed heterogeneous computer network comprises:
        the Windows computer, having a Windows policy editor configured to create policies that can be read, in their native format, by a Windows client computer to set policy settings on the Windows client computer but that cannot be read, in their native format, by a Unix client computer to set policy settings on the Unix client computer;
        the Unix computer, wherein execution of the translator manager and the translator by the computer processor causes the Unix computer to:
            receive a Windows policy that was constructed on the Windows computer according to a policy standard developed for and utilized by, the Windows operating system, wherein the Unix operating system does not directly utilize the policy standard developed for, and utilized by, the Windows operating system;
            execute the translator, the translator configured to execute under the Unix operating system and translate the Windows policy from the policy standard developed for, and utilized by the Windows operating system to configuration information usable by the Unix operating system;
            store the configuration information on the Unix computer;
            maintain an association between the Windows policy and the configuration information;
            detect a change to the Windows policy on the Windows computer;
            determine that the configuration information on the Unix computer, for which there is an association with the changed Windows policy, needs to be changed;
            execute the translator to translate the changed Windows policy into changed configuration information usable by the Unix operating system; and
            store the changed configuration information on the Unix computer;
    wherein the Windows policy is a Windows policy file used to set configurable options for at least one computer user, and wherein, after translation by the Unix computer, the Windows policy remains centrally managed and updated by the Windows computer, and updates to the policy are propagated to the Unix computer, such that use of Windows native policies is extended to allow an administrator to use Windows native policies to manage configuration information on the Unix computer.

2. The system of claim 1, wherein the Windows policy defines configuration of at least one application for each of a plurality of users within a group.

3. The system of claim 1, wherein the Windows policy defines configuration information for each of a plurality of users within a group.

4. A method of managing policies on a computer having a Linux operating system, the method comprising:
    storing a translator manager in a tangible storage medium of a Linux computer connected to a heterogeneous computer network having computers with multiple operating systems, including at least the Linux computer and a Windows computer that has a Windows policy editor configured to create policies that can be read, in their native format, by a Windows client computer to set policy settings on the Windows client computer but that cannot be read, in their native format, by a Linux client computer to set policy settings on the Linux client computer; and
    storing a translator in a tangible storage medium of the Linux computer, wherein execution of the translator manager and the translator by a computer processor of the Linux computer causes the Linux computer to:
        receive a Windows policy that was constructed on the Windows computer according to a policy standard developed for and utilized by, the Windows operating system, wherein the Linux operating system does not directly utilize the policy standard developed for, and utilized by, the Windows operating system;
        execute the translator, the translator configured to execute under the Linux operating system and translate the Windows policy from the policy standard developed for, and utilized by the Windows operating system to configuration information usable by the Linux operating system;
        store the configuration information on the Linux computer;
        maintain an association between the Windows policy and the configuration information;
        detect a change to the Windows policy on the Windows computer;
        determine that the configuration information on the Linux computer, for which there is an association with the changed Windows policy, needs to be changed;
        execute the translator to translate the changed Windows policy into changed configuration information usable by the Linux operating system; and
        store the changed configuration information on the Linux computer;
    wherein the Windows policy is a Windows policy file that can be associated with an object in a Windows directory service, and wherein, after translation by the Linux computer, the Windows policy remains centrally managed and updated by the Windows computer, and updates to the policy are propagated to the Linux computer, such that use of Windows native policies is extended to allow an administrator to use Windows native policies to manage configuration information on the Linux computer.

5. The method of claim 4, wherein the Windows policy defines configuration of at least one application for each of a plurality of users within a group.

6. The method of claim 4, wherein the Windows policy defines configuration information for each of a plurality of users within a group.

7. A signal bearing medium tangibly embodying a program of machine-readable instructions executable by a digital processing apparatus to perform operations to manage policies on a computer having a non-Windows operating system, the operations comprising:

receiving a Windows policy on a second computer having a non-Windows operating system, the Windows policy constructed on a first computer having a Windows operating system according to a policy standard developed for and utilized by, the Windows operating system, wherein the non-Windows operating system does not directly utilize the policy standard developed for, and utilized by, the Windows operating system; and executing a translator on the second computer, the translator configured to execute under the non-Windows operating system and translate the Windows policy from the policy standard developed for, and utilized by the Windows operating system to configuration information usable by the non-Windows operating system;

storing the configuration information on the non-Windows computer;

maintaining an association between the Windows policy and the configuration information;

detecting a change to the Windows policy on the Windows computer;

determining that the configuration information on the non-Windows computer, for which there is an association with the changed Windows policy, needs to be changed;

executing the translator to translate the changed Windows policy into changed configuration information usable by the non-Windows operating system; and storing the changed configuration information on non-Windows computer;

wherein the policy is used to set configurable options of the second computer such that the first computer at least partially manages configuration of the second computer, and wherein, after translation by the non-Windows computer, the Windows policy remains centrally managed and updated by the Windows computer, and updates to the policy are propagated to the non-Windows computer, such that use of Windows native policies is extended to allow an administrator to use Windows native policies to manage configuration information on the non-Windows computer.

8. The signal bearing medium of claim 7, wherein the Windows policy defines configuration of at least one application for each of a plurality of users within a group.

9. The signal bearing medium of claim 7, wherein the Windows policy defines configuration information for each of a plurality of users within a group.

10. A group policy management system comprising:

a first computer having a Windows operating system and configured to create a group policy in a format that is native to the Windows operating system and that defines configuration of at least one application for each of a plurality of users within a group and to transmit the group policy to a plurality of other computers, wherein the first computer cannot natively manage configuration information on a non-Windows computer and wherein the group policy can be read, in its native format, by a Windows client computer to set policy settings on the Windows client computer but cannot be read, in its native format, by a non-Windows client computer to set policy settings on the non-Windows client computer; and a second computer having a non-Windows operating system and configured to:

receive a group policy from the first computer in the format that is native to the Windows operating system;

translate the group policy into a translated group policy that has a format that is native to the non-Windows operating system;

apply the translated group policy on the second computer, thereby configuring at least one application in accordance with the group policy;

maintain an association between the group policy on the first computer and the translated group policy on the second computer;

detect a change to the group policy on the first computer;

determine that the translated group policy on the second computer, for which there is an association with the changed group policy on the first computer, needs to be changed;

translate the changed group policy on the first computer into a changed translated group policy; and apply the changed translated group policy on the second computer;

wherein the group policy is used to set configurable options of the second computer such that the first computer at least partially manages configuration of the second computer, and wherein, after translation by the second computer, the Windows policy remains centrally managed and updated by the first computer, and updates to the policy are propagated to the second computer, such that use of Windows native policies is extended to allow an administrator to use Windows native policies to manage configuration information on the second computer.

11. The system of claim 10, further comprising a third computer having a Windows operating system and configured to receive the Windows group policy from the first computer and to apply the group policy on the third computer.

12. The system of claim 11, further comprising a fourth computer having a non-Windows operating system that is different from the non-Windows operating system on the second computer and that is configured to receive a group policy from the first computer in the format that is native to the Windows operating system, to translate the group policy into a translated group policy that has a format that is native to the non-Windows operating system of the fourth computer, and to apply the group policy on the fourth computer.

13. A group policy execution system comprising computer hardware configured to perform operations comprising:

receiving, at a computer having a non-Windows operating system, a Windows group policy that has a format that is native to a Windows operating system but is not native to the non-Windows operating system and that defines configuration information for each of a plurality of users within a group, wherein the Windows group policy can be read, in its native format, by a Windows client computer to set policy settings on the Windows client computer but cannot be read, in its native format, by a non-Windows client computer to set policy settings on the non-Windows client computer;

translating the Windows group policy into a translated group policy that has a format that is native to the non-Windows operating system; and applying the translated group policy on the computer;

maintaining an association between the Windows group policy and the translated group policy;

detecting a change to the Windows group policy on the Windows computer;

determining that the translated group policy on the non-Windows computer, for which there is an association with the changed Windows group policy, needs to be changed;

translating the changed Windows group policy into a changed translated group policy; and applying the changed translated group policy on the computer;

wherein the group policy is a Windows policy file used to set configurable options for a group of computer users, and wherein, after translation by the computer, the Windows group policy remains centrally managed and updated by the Windows computer, and updates to the policy are propagated to the computer, such that use of Windows native policies is extended to allow an administrator to use Windows native policies to manage configuration information on the computer.

14. The system of claim 13, wherein the Windows group policy defines configuration of at least one application for each of a plurality of users within a group.

15. The system of claim 13, wherein the Windows group policy facilitates management of a group of computers.

16. An application configuration policy execution system comprising computer hardware configured to perform operations comprising:

receiving, at a computer having a first operating system, an application configuration policy that has a format that is native to a second operating system but is not native to the first operating system and that defines a configuration of at least one application for each of a plurality of users within a group;

translating the application configuration policy into a translated application configuration policy that has a format that is native to the first operating system;

applying the translated application configuration policy on the computer, thereby configuring at least one application in accordance with the application configuration policy;

maintaining an association between the application configuration policy and the translated application configuration policy;

detecting a change to the application configuration policy;

determining that the translated application configuration policy, for which there is an association with the changed application configuration policy, needs to be changed;

translating the changed application configuration policy into a changed translated application configuration policy that has a format that is native to the first operating system; and applying the changed translated application configuration policy on the computer, thereby configuring at least one application in accordance with the changed application configuration policy, wherein, after translation by the computer, the application configuration policy remains centrally managed and updated under a format that is native to the second operating system, and updates to the application configuration policy are propagated to the computer, such that use of native policies under the second operating system is extended to allow an administrator to use policies native to the second operating system to manage application configuration policies on the computer having the first operating system.

17. The system of claim 16, wherein the application configuration policy controls behavior of an application for each user within a group.

18. The system of claim 16, wherein the application configuration policy is a group policy.

19. The system of claim 18, wherein the group policy facilitates management of a group of computers.

* * * * *